United States Patent [19]

Fowler

[11] 3,876,411

[45] Apr. 8, 1975

[54] METHOD OF MAKING MULCH
[75] Inventor: Leslie L. Fowler, Tulsa, Okla.
[73] Assignee: Cata-Sep Corporation, Tulsa, Okla.
[22] Filed: Oct. 23, 1973
[21] Appl. No.: 408,395

[52] U.S. Cl.................. 71/11; 71/23; 71/64 DC; 71/64 G; 71/64 SC; 47/9
[51] Int. Cl. ............................................. C05f 7/00
[58] Field of Search............ 71/1, 25, 8, 11, 22, 23, 71/64 DC, 64 SC, 64 F, 64 G, 64 DB, 64 E; 47/9

[56] References Cited
UNITED STATES PATENTS

| | | | |
|---|---|---|---|
| 2,534,787 | 12/1950 | Mecca | 71/1 X |
| 3,219,433 | 11/1965 | Brewster et al. | 71/64 F |
| 3,252,785 | 5/1966 | Hoblit | 71/23 |
| 3,598,563 | 8/1971 | Burch | 71/25 |
| 3,645,714 | 2/1972 | Heming et al. | 71/64 G X |

Primary Examiner—Charles N. Hart
Assistant Examiner—Ferris H. Lander

[57] ABSTRACT

A method of converting latex materials and organic matter into mulch for complementing soil with nutrients and comprising the steps of:
1. mixing latex material and organic material in proportions to provide fluffy globules;
2. drying the mixture; and
3. pulverizing the dried mixture to a desired particle size.

The method may also include the steps of adding soil additives and a suitable soil additive carrier to the mixture before drying. The method may also include the steps of compressing the mixed material into sheets or brochettes before drying whereby the said sheets or brochettes may then be pulverized to a desired particle size.

4 Claims, No Drawings

METHOD OF MAKING MULCH

BACKGROUND OF THE INVENTION

1. Field of the Invention

This invention relates to a method of making mulch and more particularly but not by way of limitation, to the converting of waste latex material and organic matter to mulch which may be used for complementing soil with nutrients. The invention also relates to the field of ecology and environmental protection in providing a useful product from wasted latex materials which would otherwise be difficult to dispose of.

2. Description of the Prior Art

In the manufacture of copolymers and of products using copolymers and the like there is often waste due to spills, contaminated material and processes that deviate from standards that are very difficult to dispose of since the material seems to clog drains and seals off water when in its latex form.

There are also many sources of organic waste such as saw dust, paper, bark, leaves, twigs, corn stalks, grass cuttings and other plant cuttings which are often disposed of by burning, thereby resulting in harmful smoke which pollutes the atmosphere and can cause damage to vegetation and other property.

SUMMARY OF THE INVENTION

The present invention contemplates a novel means for utilizing waste latex materials and waste organic matter in a manner which would not create any danger to the ecology and still present a material for complementing soil thereby permitting increased vegetation.

The primary object of the present invention is to mix waste latex material with organic matter in the proper proportion to create small globules of the mixture whereby the said latex will film over the organic particles leaving portions of the said organic particles extending out of the globules which will create a wicking action for the retention of moisture in the soil, the said latex ultimately disintegrating into the soil.

The mulch created by the mixture of latex waste and organic matter is also particularly adaptable for the carrying of soil additives such as sulfur compounds, sulfur being a rubber accelerator, fly ash and commercial fertilizers, along with a suitable soil additive carrier such as clay, and more particularly, bentonite and vermiculite.

Further objects and advantageous features of the present method will hereinafter more fully appear in connection with the detailed description of the preferred embodiment.

DESCRIPTION OF THE PREFERRED EMBODIMENT

The object of the present invention is to provide a method of making mulch which comprises the utilization of latex materials and organic matter as a basic mixture for mulch. The addition of certain clay material is suitable for carrying desirable soil additives, such as sulfur, sulfates, ammonium sulfate, iron waste, fly ash and dies. In addition to the useful purpose of making mulch this invention provides a use for hard to dispose of latex wastes which can plague the manufacturer of copolymers, synthetic rubbers and the like. This invention will also provide a commercial use for organic wastes, more particularly, of the shreddable type such as saw dust, paper, bagasse, tree bark, leaves, twigs, grass cuttings, corn stalks and the like which are often disposed of by burning.

In the first step it is desirable to mix the latex waste materials and organic matter in suitable proportions to form small globules of the latex having the organic matter distributed therethrough and extending outwardly therefrom. The latex will tend to coat the organic materials but will not coat them to the extent of hermetically sealing them within the latex material. If it is desired to include soil additives to the mulch it will be necessary to adjust the proportions thereof to still obtain the same consistency of the globules.

In order to enable the mulch to adequately carry the fertilizer or other soil additives it is desirable to add a sufficient amount of clay like material, such as bentonite and vermiculite which will help set up sufficient hardness of the material and since these clays seem to swell up on drying they are also helpful in breaking up the particles into the desired particle size. The addition of sulfur which is an accelerator for rubber and the addition of suitable sulfur compounds, such as ammonium sulfate, tends to color the mixture, help in hardening the mixture and also adds fertilizer thereto. Various dyes may be added to the mixture to obtain a desirable color, although it is pointed out that the addition of sulfur will naturally provide green coloring to the mixture.

Iron wastes, such as metal dust, iron filings and various slag material can also be added to the mixture in addition to other desirable additives, such as fly ash, volcanic ash and the like.

After all of the desired materials have been thoroughly mixed, said mixture may then be discharged onto a conveyer belt or the like and dried by the use of infrared lamps, suitable ovens and the like.

It may also be desirable or expedient to discharge the above mixture into a compressor or the like whereby the said mixture may be compressed in suitable sized sheets or brochettes for ease of shipment and handling after the said sheets or brochettes have been subjected to the drying process, again comprising infrared lights, ovens or the like. If the said mulch is formed into sheets, brochettes or the like, it would then be necessary before the use thereof to pulverize these sheets or brochettes into suitable size globules for subsequent distribution to the soil.

Other than the obvious advantage of adding organic matter to the soil, these fibrous organic particles will extend outwardly from the pulverized particles, thereby creating a wicking action which will tend to retain moisture in the soil and also aid the latex to ultimately disintegrate into the soil.

From the foregoing it will be apparent that the present invention provides a means for making mulch from latex materials and organic matter, said mulch also being suitable for carrying fertilizers and other desirable soil additives. The novel method for making mulch is simple and efficient to manufacture and economical and beneficial by providing a means for disposing of waste latex type material and organic matter while providing a useful product therefrom.

Whereas, the present invention has been described in particular relation to the preferred embodiment thereof, it is manifest that many changes may be made in the details of the process apart from those suggested herein which are within the spirit and scope of this invention. It is further understood that the invention is not to be limited to the specific embodiments set forth herein but is to be limited only by the scope of the attached claim or claims, including the full range of equivalency to which each element or step thereof is entitled.

What is claimed is:

1. The method of converting latex material and organic matter into mulch for complementing soil nutrients comprising the steps of:
    1. mixing synthetic rubber material with organic matter and soil additive, the proportion of organic matter and soil additive being such as to form small globules of said synthetic rubber material, said globules having the organic matter and soil additive distributed therethrough and extending outwardly therefrom, the organic matter being selected from the class of wood shavings, sawdust, shredded paper, bark chips, leaves, twigs and grass cuttings and the soil additive being selected from the class of fly ash, volcanic ash, bentonite and vermiculite;
    2. drying the mixture; and
    3. pulverizing the dried mixture to a desired particle size.

2. The method as set forth in claim 1 including the step of mixing fertilizer with the synthetic rubber material, organic matter and soil additive.

3. The method of claim 1 wherein the drying is accomplished by treating the mixture with infrared lighting.

4. The method as set forth in claim 1 wherein the drying is accomplished by heating the mixture.

* * * * *